Nov. 21, 1944.  J. S. STEWART  2,363,023
FLOW GUN
Filed Sept. 12, 1941
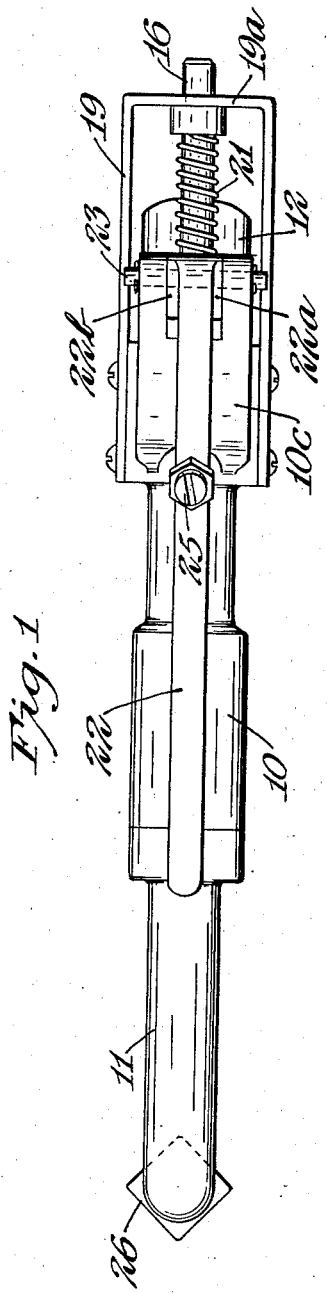
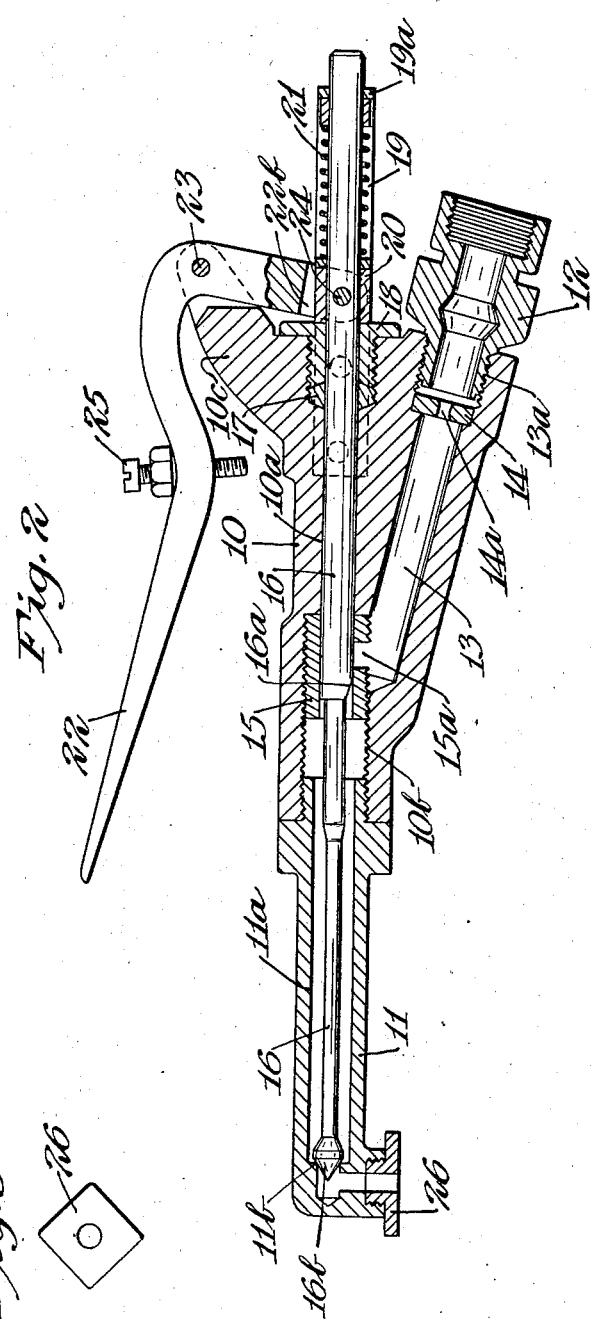
Inventor
John S. Stewart
By Paul Carpenter
Attorney Patented Nov. 21, 1944

2,363,023

UNITED STATES PATENT OFFICE 2,363,023

FLOW GUN

John S. Stewart, Port Washington, N. Y., assignor to Minnesota Mining & Manufacturing Company, St. Paul, Minn., a corporation of Delaware Application September 12, 1941, Serial No. 410,564

7 Claims. (Cl. 18—3.5)

This invention relates to nozzles or "guns" that are used to dispense flowable material which is supplied to the gun under pressure.

More particularly it relates to guns used in dispensing extremely viscous material and placing it on surfaces or in crevices, seams, corners, grooves, rabbets, etc.

Such guns are usually of a nozzle-like design, attached to the end of a hose that conducts the material from a pressure pump to the gun, equipped with a valve that is opened and closed by a trigger or handle and with a tip or outlet port of a size and shape to suit the particular operation for which the gun is employed. In coating a broad surface (such as the inside of an automobile body, for example) with a layer of cement, the nozzle tip will be shaped to spread an even coating over as wide a space as possible. In caulking seams the tip will be shaped accordingly. In filling a crevice (as in glazing, i. e., setting sheets of glass in frames), the nozzle tip may serve the additional function of being a beading spoon or shaping trowel to press or "to draw" the material into and along the desired shape and place. In applying paint, as in "striping" an automobile body, the striping tip will be of appropriate design.

A problem which has heretofore been unsolved in any of the prior guns known to me is the accurate delivery and placement of material that is extremely viscous, including material that contains fibres. Movement of such material from its storage tank through the necessary hose and nozzle (or gun) to its ultimate position in use requires high pressures, sometimes of 1000 pounds or more at the pump. When the gun is open the pressure at the gun tip is sufficiently low to produce a moderate flow that can be neatly handled by an experienced operator; but when the valve in the old type of gun is closed the pressure builds up throughout the system until the pressure at the gun tip is equal to that at the pump. The result is that when the old type gun is again opened there is a great surge of material which is harmful in many operations especially in fine accurate sealing operations such as glazing.

Another weakness of prior guns is that their mechanisms become sticky and they often clog when dispensing extremely sticky or viscous materials, especially when the gun is laid aside momentarily during use. Therefore a second problem is to produce a gun capable of handling such materials without sticking. This problem and the problem of surging are somewhat linked together in that any mechanism designed to overcome surging must retain sufficient simplicity to avoid sticking; and, conversely, the mechanism cannot be simplified or rearranged to the extent of permitting surging.

Another problem is to design valves and passageways which will not clog when fibre-containing cements are dispensed.

Another problem (which is encountered particularly in glazing) is to secure a nozzle tip of a shape that will permit rapid and accurate placement of cement to form smooth lines and good corners with the minimum requirement of skill on the part of the operator.

Consequently, objects of this invention include the construction of a gun which will, inter alia, solve the above problems. Guns which have been constructed according to the present invention have been found so to do.

Briefly the present invention comprises the provision in a flow gun of a plurality of successively opening valves and in another aspect the invention provides a glazing gun with a tip of substantially square or diamond shape.

More particularly the invention provides a gun having a chamber or "barrel" with a nozzle valve and a breech valve and means for operating said valves in synchronism to secure an opening or closing of the ports, adapted to open the outlet port and thereafter gradually open the breech port in initiating dispensing operation and to gradually close the breech port and thereafter close the outlet port in terminating dispensing operation, and a trigger mechanism for manual control of the valve operating means.

The device that is described and illustrated herein as an example of an embodiment of the present invention is a portable glazing gun adapted to apply plastic glazing or sealing material, including fibre-containing material, to the "putty rabbets" in the setting of sheets of glass in frames, said material being supplied to the gun under pressure.

In the accompanying drawing, in which like reference characters refer to the same parts in the different figures:

Figure 1 is a top plan view;

Figure 2 is a vertical cross section taken on the longitudinal axis; and

Figure 3 is a bottom view of the shaping tip or spoon.

The gun comprises a rear portion or breech structure and mechanism 10 and a forward portion or barrel 11. The barrel is bored with the bore 11a along its longitudinal axis throughout its entire length except at the forward end where the bore follows the downward turn of the nozzle's tip. The breech structure 10 is bored throughout its length with the bore 10a coaxial with the gun bore 11a.

The forward end of the breech structure is counterbored and threaded to form the chamber 10b which is threaded along its full length. The breech of the barrel 11 is reduced in size and threaded to fit into the chamber 10b so that the barrel may be held to the breech structure in removably fixed relation by threaded engagement therewith.

The cement or other viscous or flowable material which is supplied to the gun under pressure (usually through a hose), enters the gun through the hose coupling 12 which is removably held in the breech structure by threaded engagement therewith and which removably holds the supply hose (not shown) by threaded engagement. The coupling is bored along its long axis to pass the cement which flows from the supply hose through the coupling and then into the main bore 11a of the gun by passing through a connecting entrance passage 13 which extends from the bore of the coupling 12 upwardly into the chamber 10b. The axis of passage 13 runs forwardly and, as it happens in this particular embodiment shown in the drawing, when extended makes an acute angle with the axis of bore 10b.

The passage or bore 13 is counterbored at its rear end to form the gun's inlet port or chamber 13a which is threaded to receive the coupling 12. The forward end of the chamber is preferably left unthreaded and this, plus the shoulder formed by the counterbore, adapts it to receive a washer-shaped choke 14 which is pierced with a flow orifice 14a. The choke is removable to permit substituting chokes with flow orifices of various sizes.

The material passes from the entrance passage 13 into the main bore 11a in the barrel of the gun through the breech port 15a in the valve sleeve 15 which is in the rear end of chamber 10b in threaded engagement therewith. The bore of the sleeve is coaxial with the main bore 11a of the barrel, and the breech port 15a admits the material into the sleeve bore (and thereby into the barrel bore 11a) from the entrance passage 13.

The breech port 15a is closed by the sliding valve 16a on the valve stem 16 which is slidably held in the bore 10a which extends rearwardly through the breech structure coaxial with the gun bore 11a. The breech valve is a cylindrical valve which closes the breech port by sliding across it. The shoulder on the valve stem 16 which is formed at the point where the forward portion of the stem is reduced in diameter, is located a short distance forward of the breech port when the valve is in closed position (as shown in Figure 2 of the drawing). The side of the valve adjacent the port is tapered gradually toward the shoulder so that when the valve is opened by moving it rearwardly, it opens gradually. This taper begins sufficiently far forward of the port to leave an unreduced portion of the cylindrical part of the valve extending forwardly of the port so that the valve has to move rearwardly for a distance before the port begins to open.

From the valve 16a rearwardly, the valve stem 16 fits snugly within the bore 10a; additionally the breech structure is counterbored at its rear end and a suitable packing 17 is held in place around the valve stem in the counterbore by the threaded sleeve 18, to prevent flow of material rearwardly.

The valve stem 16 extends rearwardly from the gun for a distance and is slidably supported at its rear end by being passed through a suitable aperture in the closed end 19a of the U-shaped bracket 19 which is screwed to the sides of the gun. A collar 20 is fixed upon the valve stem rearwardly of the gun. Behind the collar a spring 21 is coiled around the valve stem between the collar and the end 19a of the bracket (with suitable washers etc., between the ends of the spring and the gun parts). The spring is loaded to press the valve stem forwardly whereby the valve 16a normally closes the port 15a.

The valve stem 16 is moved rearwardly by a "trigger" or handle 22 which is pivoted on the pin 23 between the arms of the bifurcated upward projection 10c at the rear of the gun. The downwardly turned rear end of the handle is bifurcated to form the arms 22a and 22b between which the valve stem is held. A freely turning pin 24 pierces the arms 22a and 22b, also the valve stem 16 and the collar 20 so that downward pressure on the handle 22 impels the valve stem rearwardly against the spring 21. Set-screw 25 limits the downward movement of the handle and thereby the rearward movement of the valve stem.

The forward portion of the valve stem 16 which extends forwardly into the barrel is reduced in diameter and the adjacent bore 11a has a sufficiently large diameter so that the material may have space in which to move forwardly between the valve stem and the wall of the bore toward the tip of the nozzle at or near which point the bore 11a is reduced in size in such a manner as to form a shoulder or seat 11b which is adapted to receive the cone-shaped nozzle valve 16b which is on the forward tip of the valve stem, whereby to close the outlet port in the muzzle or nozzle. This seating of the nozzle valve 16b may serve as a stop against further forward movement of the valve stem, or, the collar 20 may be fixed at such a point on the valve stem that it presses against the rear face of the sleeve 18 at the same time that the nozzle valve seats, thereby reducing the pressure on said valve.

The two valves are preferably shaped and positioned on the stem so that as the handle is pressed by the operator to initiate a dispensing operation and the valve stem begins to move rearwardly, the nozzle valve 16b opens before the second or breech valve 16a opens and so that when the breech valve does open, it provides at first only a very small aperture as compared with that of the nozzle valve, and so that said aperture increases in size at a rate of speed slower than the speed of the opening of the nozzle valve. In shutting off the gun to terminate a dispensing operation, the rear valve 16a closes gradually and closes first. The nozzle valve 16b is preferably close behind the discharge tip.

The use of these two valves, one at each end of the barrel, prevents surging when the glazing or other material is released to initiate dispensing operation. The static pressure exerted by this material may be as high as 1000 pounds per square inch when not flowing, and if merely released from a nozzle there would normally be a surge before regular flow became established. In accordance with this invention, the initial opening of the nozzle valve causes no surge of material since the breech valve is still closed and the material in the barrel remains stationary. Then as the breech valve gradually opens, the material under pressure behind this valve gradually flows into the breech and the material which is already in the barrel is propelled forwardly and out the nozzle without surging, since the material in the barrel acts as a "shock absorber" and resists the pressure of the small amount of material which first comes into the breech, the high initial pressure behind the breech valve spending itself in forcing the plastic material through the barrel and nozzle. That is, the space within the gun bore along the barrel between the nozzle and breech valves forms a chamber or "reservoir" which provides a column of plastic material that stands motionless at zero pressure after the gun is shut off and which acts as a shock absorber when the breech valve is opened, thereby contributing to the ultimate result which the gun produces, namely the elimination of substantially all sudden surging of material out of the tip upon opening the gun.

When the gun is being shut off by releasing the handle 22 to permit the spring 21 to push the valve stem forwardly, the breech valve 16a gradually closes first, thus giving the material in the bore of the gun time to spend its pressure before the nozzle valve 16b closes. However the nozzle valve preferably closes quickly enough after the breech valve closes to prevent material from dribbling out and to hold within the barrel the above mentioned "shock absorber" column of motionless material which is at zero pressure.

Further regulatory control of the pressure and volume can be had by inserting different choke elements 14 with flow orifices of a size to suit the viscosity and flowability of the particular material to be applied.

Further control at the tip of the gun may be had by changing the shape of the nozzle valve 16b to increase or decrease the flow space around it.

In addition to being free from surging, guns made in accordance with the present invention have been found capable of dispensing extremely sticky or viscous material without the valve stem, packing, or other working parts becoming sticky or clogged enough to hinder the gun's efficient performance.

This is thought to be due broadly to the reduction to a minimum of any opportunity for the "line pressure" to be exerted directly against the packing and the closely fitted moving parts. In the present embodiment such parts include the rear portion of the valve stem 16, its supporting bore 10a and the packing 17. With the valve stem being thus supported at a point well to the rear of the valves and of the breech port 15a through which the material enters the barrel, the only point on the said moving parts at which the full line pressure from the supply hose is ever directly exerted is through the relatively small breech port 15a against the wall of the cylindrical valve 16a.

Among other factors which may contribute to the elimination of the sticking are the use of the sliding cylinder type valve 16a at the breech; the mounting of the valves on a single stem whose supporting means (the bore 10a) is well out of the direct path of the high pressure stream of material through the gun; employment of a breech valve that permits removal of any packing (17) from direct contact with the high pressure stream.

The outlet port or nozzle tip may be of a size and shape to suit the material and the operation that is being performed.

In the illustrated embodiment (which is a glazing gun) the discharge tip turns downwardly and is fitted with a detachable beading spoon (or pointing spoon, trowel or shaping tip) 26, having a flow orifice that opens within the area of the troweling surface and having a flat or plane substantially square troweling surface positioned with one diagonal of the square parallel to a plane passing through the gun's longitudinal axis (as shown in Figure 1) so that in relation to the gun as a whole it is "diamond-shaped." In the illustrated embodiment the one diagonal is approximately coincident with a plane passing through the gun's longitudinal axis but since the same "diamond-shape" effect could be retained even though the tip were located with the diagonal to one side of the plane, making it parallel thereto instead of exactly coincident therewith, the description in the claims of the diagonal as being substantially parallel to the plane is intended to include a diagonal that is coincident therewith as well.

The plane surface of the trowel, however, may form any convenient angle with the gun's axis. In the present embodiment it is substantially parallel thereto, as shown in Figure 2.

The square trowel (as shown in Figure 1) may be somewhat "elongated," if desired, to form a parallelogram so as to make it conform more closely to what is commonly termed "diamond-shape" or it may be rectangular without departing from the spirit of the invention. The shape and angular or "diamond-shaped" position of the tip (i. e., with one corner or point foremost) is regarded as one of the novel and important features of this invention. This shape, and angle, particularly in glazing, lends itself to a natural drawing action when the rabbet is being filled by a stroke of the gun, permits faster and more accurate shaping of corners, affords better vision for the operator than prior art tips, makes it easier to get smoother lines and reduces the amount of manual skill ordinarily required for all phases of the glazing operation.

While suitable dimensions of glazing guns or like dispensing apparatus of the present invention will be apparent from the above description to those skilled in the art, depending upon the particular circumstances and material to be dispensed, etc., the following approximate dimensions are given for the sake of further clarity and by way of example: the overall length of the gun may be on the order of six to eight inches; the diameters of the nozzle port and of the breech port may be approximately one-eighth inch and the distance between them of the order of two inches; the inside diameter of the barrel may be from one-half to three-fourths inch; and the beading spoon may be from three-eighths to one-half inch square with a one-eighth inch flow orifice.

The above approximate dimensions indicate the general size and proportions of a glazing gun adapted to dispense viscous rubber-containing glazing cements, in setting sheets of glass in frames, the cements being supplied to the gun under high pressures such as 1000 pounds per square inch at the pump. A detailed description of types of glazing cements which may be applied with the gun of this invention is given in the copending application of Grant S. Merrill Serial No. 380,078 filed February 21, 1941. It is of course understood that the dimensions and proportions of the gun and the relative size of the various orifices would vary with the type and viscosity of the material being dispensed, conditions of application such as temperature and pressure, and the type of operation being performed.

Also it will be clear that the principles and advantages of this invention may be employed by constructing a gun or dispensing mechanism which is very different in general appearance. For example, where the breech valve and nozzle valve are operated by electrical means (which may be actuated by the operator in the desired synchronism by the movement of a single button or lever, such as handle 22), it will be evident that the valve stem 16 might be eliminated, or very differently constructed, and the chamber between ports 15a and 11b might be of an entirely different shape, e. g. of tortuous or irregular shape.

All variations and embodiments adapted to provide the advantages, or to follow the principles of this invention, are comprehended herein.

What I claim is as follows:

1. A non-surging glazing gun for dispensing viscous cement which is supplied to the gun under high pressure comprising a barrel, a nozzle on the muzzle end of said barrel having an outlet port, the tip of said nozzle being formed into a beading spoon with a substantially square plane troweling surface that is substantially parallel to the gun's longitudinal axis and one diagonal of said square being substantially parallel to the gun's longitudinal axis, a nozzle valve in said nozzle to open and to close the said outlet port, a breech mechanism attached to said barrel having an inlet port adapted to retain a removable choke member and having a connecting entrance passage for conducting the material from the inlet port to the breech and having a breech port for admitting the material from said entrance passage into the barrel, a breech valve for opening and closing said breech port, a valve stem slidably supported in said breech mechanism coaxial with the barrel and extending into said barrel upon which stem the said valves are located in fixed relationship, the said valves being shaped and positioned so that rearward movement of the said stem will open the nozzle valve first and the breech valve second with the latter being opened more slowly than the former in initiating dispensing operations, and forward movement of the stem will close the breech valve first and the nozzle valve second with the former being closed more slowly than the latter in terminating dispensing operations, and a trigger mechanism for manual control of the valve operating means.

2. A gun adapted for dispensing viscous glazing cements under high pressure and with substantial freedom from surging comprising a barrel, a nozzle at the muzzle of the barrel having an outlet port, the tip of said nozzle being formed into a beading spoon with a substantially square plane troweling surface substantially parallel to the gun's longitudinal axis, one diagonal of said square being substantially parallel to the gun's longitudinal axis so as to form a "diamond-shaped" tip with one point of the diamond leading, a breech mechanism having a port for admitting said material into the barrel, a nozzle valve adapted to open and to close the said outlet port and a sliding breech valve in the form of a cylinder which fills the gun bore and is coaxial therewith and stops the breech port by lying across it and whose end is tapered so that withdrawal of the cylinder from across the breech port will gradually open the port, a single valve stem on which the valves are located in fixed spaced relationship, the said stem being coaxial with the said valves and with the said barrel and slidably supported at a point to the rear of the valves and to the rear of said breech port, the said valves being shaped and positioned so that in initiating a dispensing operation movement of the valve stem will open the nozzle valve first and the breech valve second with the latter being opened more slowly than the former, and in terminating a dispensing operation movement of the stem will gradually close the breech valve first and thereafter close the nozzle valve, the said ports being sufficiently spaced apart and the said barrel being of sufficient size to form a chamber between said ports to hold a quantity of the said material sufficient to act as a shock absorbing column to assist in preventing surging at the nozzle upon opening the valves, an inlet port through which the material is conducted to the said breech port, said inlet port being adapted to receive a removable choke member having a flow orifice, and a trigger mechanism for manual control of the valve stem.

3. A gun adapted for dispensing viscous glazing cements under high pressure and with substantial freedom from surging comprising a barrel, a nozzle at the muzzle of the barrel having an outlet port, the tip of said nozzle being formed into a beading spoon with a substantially square plane troweling surface, one diagonal of said square being substantially parallel to a plane passing through the gun's longitudinal axis so as to form a "diamond-shaped" tip with one point of the diamond leading, a breech mechanism having a port for admitting said material into the barrel, a nozzle valve adapted to open and to close the said outlet port and a sliding breech valve in the form of a cylinder which fills the gun bore and is coaxial therewith and stops the breech port by lying across it and whose end is tapered so that withdrawal of the cylinder from across the breech port will gradually open the port, a single valve stem on which the valves are located in fixed spaced relationship, the said stem being coaxial with the said valves and with the said barrel and slidably supported at a point to the rear of the valves and to the rear of said breech port, the said valves being shaped and positioned so that in initiating a dispensing operation movement of the valve stem will open the nozzle valve first and the breech valve second with the latter being opened more slowly than the former, and in terminating a dispensing operation movement of the stem will gradually close the breech valve first and thereafter close the nozzle valve, the said ports being sufficiently spaced apart and the said barrel being of sufficient size to form a chamber between said ports to hold a quantity of the said material sufficient to act as a shock absorbing column to assist in preventing surging at the nozzle upon opening the valves, an inlet port through which the material is conducted to the said breech port, said inlet port being adapted to receive a removable choke member having a flow orifice, and a trigger mechanism for manual control of the valve stem.

4. A non-surging glazing gun for dispensing viscous cement which is supplied to the gun under high pressure comprising a barrel, a nozzle on the muzzle end of said barrel having an outlet port, the tip of said nozzle being formed into a beading spoon with a substantially square plane troweling surface that is substantially parallel to the gun's longitudinal axis and one diagonal of said square being substantially parallel to the gun's longitudinal axis, a nozzle valve in said nozzle to open and to close the said outlet port, a breech mechanism attached to said barrel having an entrance passage for conducting the material from a source of supply to the breech and having a breech port for admitting the material from said entrance passage into the barrel, a breech valve for opening and closing said breech port, a valve stem slidably supported in said breech mechanism coaxial with the barrel and extending into said barrel upon which stem the said valves are located in fixed relationship, the said valves being shaped and positioned so that rearward movement of the said stem will open the nozzle valve first and the breech valve second with the latter being opened more slowly than the former in initiating dispensing operations, and forward movement of the stem will close the breech valve first and the nozzle valve second with the former being closed more slowly than the latter in terminating dispensing operations, and a trigger mechanism for manual control of the valve operating means.

5. A non-surging glazing gun for dispensing viscous cement which is supplied to the gun under high pressure comprising a barrel, a nozzle on the muzzle end of said barrel having an outlet port, the tip of said nozzle being formed into a beading spoon with a substantially square plane troweling surface, one diagonal of said square being substantially parallel to a plane passing through the gun's longitudinal axis, a nozzle valve in said nozzle to open and to close the said outlet port, a breech mechanism attached to said barrel having an inlet port adapted to retain a removable choke member and having a connecting entrance passage for conducting the material from the inlet port to the breech and having a breech port for admitting the material from said entrance passage into the barrel, a breech valve for opening and closing said breech port, a valve stem slidably supported in said breech mechanism coaxial with the barrel and extending into said barrel upon which stem the said valves are located in fixed relationship, the said valves being shaped and positioned so that rearward movement of the said stem will open the nozzle valve first and the breech valve second with the latter being opened more slowly than the former in initiating dispensing operations, and forward movement of the stem will close the breech valve first and the nozzle valve second with the former being closed more slowly than the latter in terminating dispensing operations, and a trigger mechanism for manual control of the valve operating means.

6. A non-surging glazing gun for dispensing viscous cement which is supplied to the gun under high pressure comprising a barrel, a nozzle on the muzzle end of said barrel having an outlet port, the tip of said nozzle being formed into a beading spoon with a substantially square plane troweling surface, one diagonal of said square being substantially parallel to a plane passing through the gun's longitudinal axis, a nozzle valve in said nozzle to open and to close the said outlet port, a breech mechanism attached to said barrel having an entrance passage for conducting the material from a source of supply to the breech and having a breech port for admitting the material from said entrance passage into the barrel, a breech valve for opening and closing said breech port, a valve stem slidably supported in said breech mechanism coaxial with the barrel and extending into said barrel upon which stem the said valves are located in fixed relationship, the said valves being shaped and positioned so that rearward movement of the said stem will open the nozzle valve first and the breech valve second with the latter being opened more slowly than the former in initiating dispensing operations, and forward movement of the stem will close the breech valve first and the nozzle valve second with the former being closed more slowly than the latter in terminating dispensing operations, and a trigger mechanism for manual control of the valve operating means.

7. A non-surging glazing gun for dispensing viscous cement which is supplied to the gun under high pressure comprising a barrel, a nozzle on the muzzle end of said barrel having an outlet port, the tip of said nozzle being formed into a beading spoon with a substantially square plane troweling surface, one diagonal of said square being substantially parallel to a plane passing through the gun's longitudinal axis, a nozzle valve in said nozzle to open and to close the said outlet port, a breech mechanism attached to said barrel having an entrance passage for conducting the material from a source of supply to the breech and having a breech port for admitting the material from said entrance passage into the barrel, a breech valve for opening and closing said breech port, means for operating said valves to secure an opening of the ports in synchronism such that the nozzle valve will be opened first and the breech valve second with the latter being opened more slowly than the former in initiating dispensing operations, and such that the breech valve will be closed first and the nozzle valve second with the former being closed more slowly than the latter in terminating dispensing operations, and a trigger mechanism for manual control of the valve operating means.

JOHN S. STEWART.